No. 813,212. PATENTED FEB. 20, 1906.
R. JOHNSON.
MILL PICK.
APPLICATION FILED JAN. 16, 1905.

Witnesses
Geo. Ackman Jr.
F. S. Elmor.

Inventor
Robert Johnson,
By Victor J. Evans
Attorney

UNITED STATES PATENT OFFICE.

ROBERT JOHNSON, OF GOIN, TENNESSEE.

MILL-PICK.

No. 813,212. Specification of Letters Patent. Patented Feb. 20, 1906.

Application filed January 16, 1905. Serial No. 241,367.

*To all whom it may concern:*

Be it known that I, ROBERT JOHNSON, a citizen of the United States, residing at Goin, in the county of Claiborne and State of Tennessee, have invented new and useful Improvements in Mill-Picks, of which the following is a specification.

My invention has relation to improvements in picks of the type known as "mill-picks;" and it consists in the construction and arrangement of parts, as will hereinafter be described and more particularly pointed out in the claim.

To these ends the invention comprises the novel features of construction and combination of parts more fully hereinafter described.

Figure 1:
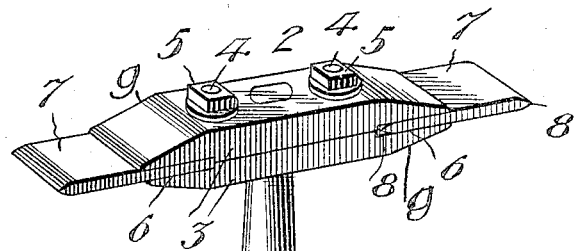
Figure 2:
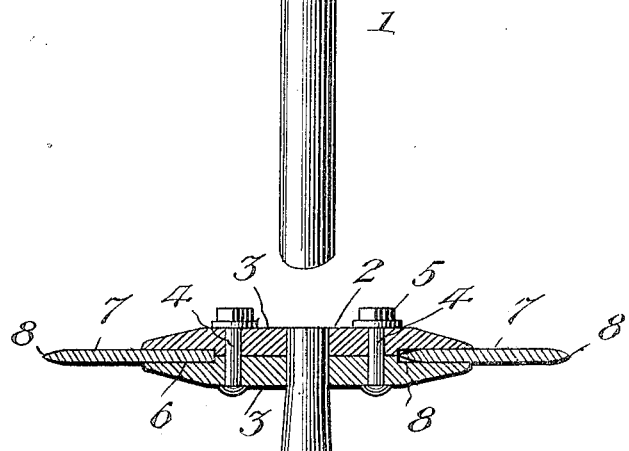

In the accompanying drawings, Figure 1 is a perspective view of a pick embodying the invention. Fig. 2 is a longitudinal section centrally through the pick-head.

Referring to the drawings, 1 designates the pick-handle, which may be of the usual or any appropriate construction and material, and 2 the pick-head, having at its longitudinal center a transverse opening in which one end of the handle is firmly seated and secured. The head 2 is composed of a pair of sections or plates 3, preferably of rectangular form, as shown, and united with their inner faces in contact by means of a pair of fastening members or bolts 4, arranged, respectively, on opposite sides of the handle 1, there being tapped onto the ends of the bolts nuts 5. The inner meeting faces of the sections 3 are recessed at their opposite ends and throughout a suitable portion of their lengths to provide sockets or seats 6, formed conjointly between the plates and at the opposite ends of the head 2 for the reception of cutting members or blades 7, the seats 6 being preferably of a length equaling substantially half the length of the respective blades. The blades 7, which are preferably of the form shown and composed of plate-steel properly tempered, are provided with sharpened cutting edges 8, the blades having either one or two of such edges, as preferred, and adapted in the instance of blades having two cutting edges for reversal to bring either edge into play. The opposite outer faces 9 of the two sections are inclined forwardly and downwardly, the inclinations being of lengths equal to the lengths of the cut-away portions which form the sockets. The construction serves to give the implement a yielding or elastic action upon the object when struck by the blade.

In practice when it is desired to attach the blades to the head the nuts 5 are loosened sufficiently to permit the introduction of the ends of the blades into the seats 6, after which the nuts are again tightened, thus actuating the head-sections 3 for securely clamping the blades, it being obvious that the blades may also be reversed or interchanged by loosening the clamping members 4.

It is to be particularly noted that in the present device the inner engaging faces of the head-sections and the faces of the blades 7 are perfectly smooth and free from teeth or other projections and that the whole area of the engaged portion of each blade bears firmly at its side face upon the adjacent faces of the head-sections, thus obviating any relative movement of the parts and minimizing vibrations incident to the operation of the tool.

From the foregoing it is apparent that I produce a simple device which may be inexpensively manufactured and one wherein the blades may be readily attached to and disconnected from the head. In attaining these ends it is to be understood that minor changes in the details herein set forth may be resorted to without departing from the spirit of the invention.

Having thus fully described the invention, what is claimed as new is—

A mill-pick comprising a sectional head composed of two plates each of which is provided on their inner faces with right-angular cut-away portions which serve to form a single socket when the sections are brought together, a single cutting-blade mounted in the socket and constructed of a thickness equal to size of the socket, said blade having its rear edge in direct contact with the vertical portions of the cut-away portions of the socket, and bolts passing solely through the two sections and having nuts thereon for securing said sections together, substantially as specified.

In testimony whereof I affix my signature in presence of two witnesses.

ROBERT JOHNSON.

Witnesses:
W. A. CHEATHAM,
P. E. CHEATHAM.